United States Patent [19]
Hashimoto

[11] 3,984,640
[45] Oct. 5, 1976

[54] TELEPHONE ANSWERING DEVICE WITHOUT OUTGOING MESSAGE TAPE

[75] Inventor: Kazuo Hashimoto, Tokyo, Japan

[73] Assignee: Hashimoto Koporeishon Kabushiki Kaisha, Tokyo, Japan

[22] Filed: Nov. 27, 1974

[21] Appl. No.: 527,864

[30] Foreign Application Priority Data
Jan. 31, 1974  Japan................................. 49-13174

[52] U.S. Cl............................................. 179/6 R
[51] Int. Cl.²........................................... H04M 1/64
[58] Field of Search................. 179/6 R, 6 AC, 6 E, 179/100.1 DR

[56] References Cited
UNITED STATES PATENTS

| | | |
|---|---|---|
| 2,528,459 | 10/1950 | Thompson et al................. 179/6 R |
| 3,064,085 | 11/1962 | Muramatsu......................... 179/6 R |
| 3,535,464 | 10/1970 | Deinzer et al............. 179/100.1 DR |
| 3,549,821 | 12/1970 | Langendorf............... 179/100.1 DR |
| 3,794,767 | 2/1974 | Todd.................................. 179/6 R |

*Primary Examiner*—Raymond F. Cardillo, Jr.
*Attorney, Agent, or Firm*—Haseltine, Lake & Waters

[57] ABSTRACT

A telephone answering device comprises an oscillator circuit for first producing a peculiar signal such as a small bird's twittering to notify a caller that he is calling a telephone answering device and thereafter intermittently producing "beep" tone signal to notify him that he can continue to send his message, the production of these signals being controlled by the combination of a multi-vibrator circuit and a buffer circuit connected between the oscillator circuit and the multi-vibrator circuit, thereby eliminating an outgoing message tape.

6 Claims, 3 Drawing Figures

TELEPHONE ANSWERING DEVICE WITHOUT OUTGOING MESSAGE TAPE

BACKGROUND OF THE INVENTION

This invention relates to telephone answering and recording devices (hereinafter referred to as telephone answering devices), and more particularly to a device.

In conventional telephone answering devices, an endless outgoing tape in which answering terms such as a telephone number and a subscriber's name have been recorded in advance is driven in response to a calling signal so that the answering terms are transmitted to a caller, and the caller's message is recorded in a different tape, that is, an incoming message recording tape.

With respect to the answering terms, there are provided strict telephone regulations in some countries. That is, the name of a subscriber, or a receiver, having a telephone answering device, a telephone number, notification of recording and so forth must be recorded in the endless tape in advance. However, when a traveler uses such a telephone answering device at the destination of his travel, it is not always necessary to transmit the answering terms to callers. In other words, if the device is so designed that upon reception of a calling signal, a peculiar signal such as a small bird's twittering instead of the answering terms is transmitted to the caller, he will understand that he is calling a telephone answering device and start sending his message over the phone. Thus, the object of the telephone answering device can be achieved satisfactorily.

Popular cassette tape recorders or extremely small tape recorders are convenient for a traveller in recording messages at his staying place on a journey. Accordingly, the device according to this invention, which will be described later in detail, is connected to the tape recorder mentioned above with particular patch cords thereby to be ready for recording messages. Upon reception of a calling signal, the telephone lines form a loop circuit and the peculiar signal is transmitted to the caller. Thereafter, during a predetermined time period, signals are transmitted to let him know that he can continue to send his message.

When the predetermined time period is over, the loop circuit of the telephone lines is opened so that the device waits for the next calling signal. If the device is so designed that the operations thereof are carried out as briefly described above, the object of the telephone answering device can be achieved.

In addition, this invention relates to improvement of the devices of Japanese patent application No. 10875/71 and Japanese patent application No. 23006/72 laid open on Oct. 11, 1972. In the Japanese patent application No. 10875/71, three relays are employed, but in the present invention only one relay is employed for obtaining the same functions. Furthermore, the present invention is more advantageous in that it is simpler in construction, stabler in operation even if a voltage applied thereto is reduced due to the consumption of the voltage source, or batteries, smaller in size so as to be convenient in carrying it with the user, smaller in power consumption, and more practical as a portable device for recording incoming messages over telephone.

SUMMARY OF THE INVENTION

Accordingly, a first object of this invention is to provide a telephone answering device in which a peculiar signal is produced in order to eliminate an outgoing tape in which answering terms have been recorded.

A second object of the invention is to provide a telephone answering device in which a peculiar signal is produced for several seconds after a loop circuit of telephone lines has been formed upon reception of a calling signal and thereafter beep tone signals are intermittently produced during a predetermined period of time so as to let a caller record his message.

A third object of the invention is to provide a telephone answering device in which a peculiar signal such as the twittering of a small bird is produced so that a caller listens to this signal for a while, without hanging up his receiver by mistaking it for a warning signal or other signals from a telephone central office.

A fourth object of the invention is to provide a telephone answering device in which the top part of a peculiar signal requesting that a caller starts sending his message is delivered, as a beep tone signal, to telephone lines by controlling a peculiar-signal generating circuit so that the circuit is operated intermittently (once in 7 or 8 seconds) for a short time (less than 0.5 second) by an astable multi-vibrator circuit.

A fifth object of the invention is to provide a telephone answering device the main body of which is connected to an incoming message recorder through the microphone jack of an ordinary cassette tape recorder, or a jack assembly consisting of small and large jacks, thereby to control the recorder.

A sixth object of the invention is to provide a telephone answering device, in which operating switches each having three positions, "automatic recording", "stop" and "manual recording" are provided, and when the switches are set at their mannual recording positions, the recording of the mutual conversation can be continued for a relatively long period of time and a peculiar signal notifying a caller that his message will recorded in an incoming message recorder is not produced, but the intervals between beep tones are lengthened twice, that is, the beep tone occurs once in 15 seconds.

A seventh object of the invention is to provide a telephone answering device in which a pilot lamp is connected in series to a relay to keep longer the service life of a power supply, or batteries, and to indicate the engaging of telephone lines and also the consumption of the batteries.

The manner in which the foregoing objects and other objects have been achieved by this invention will become more apparent from the following detailed description and the appended claims when read in conjunction with the accompanying drawings.

DETAILED DESCRIPTION OF THE INVENTION

Figure 1:
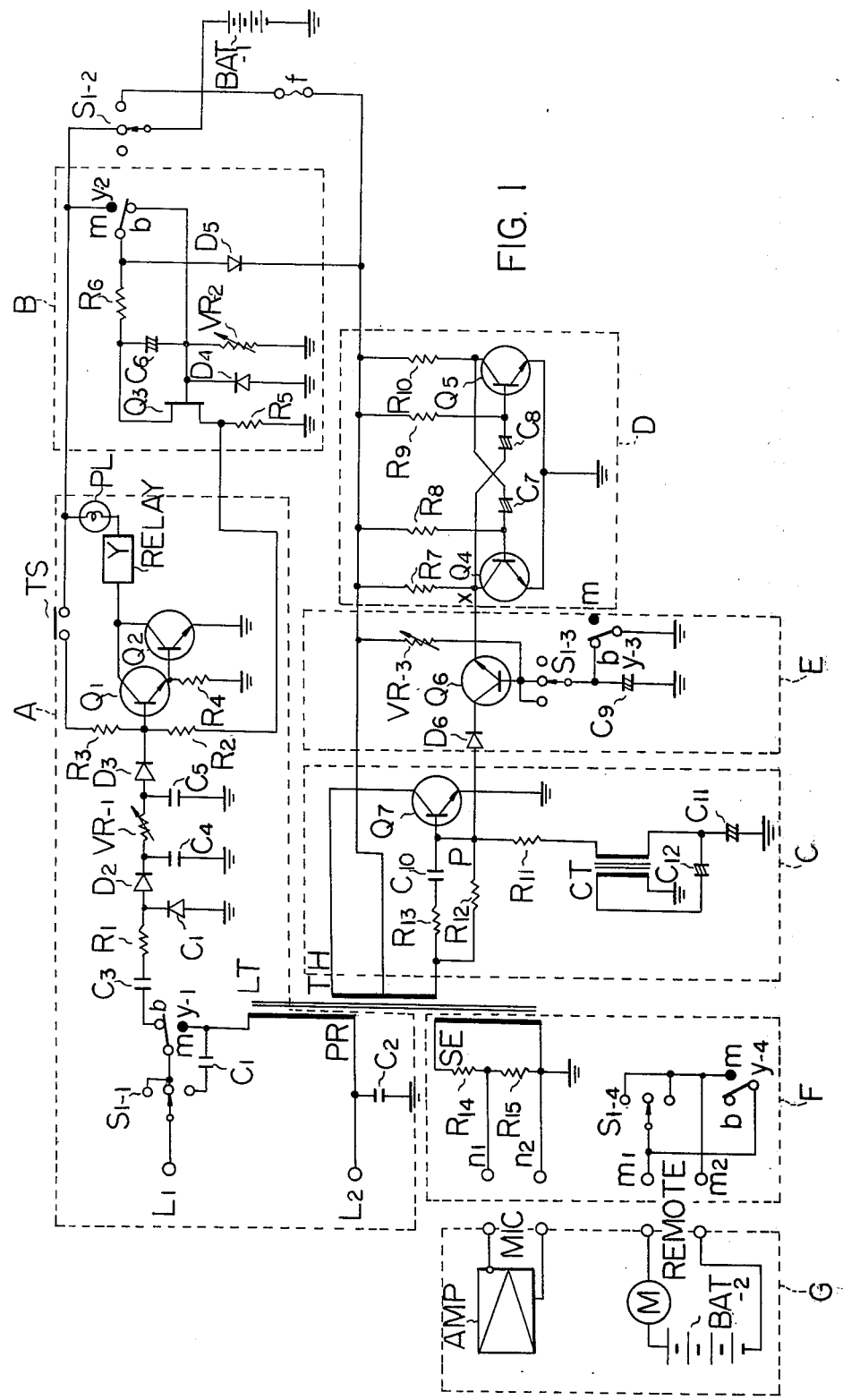
FIG. 1 is an electrical circuit diagram of a telephone answering device according to this invention.

One example of a telephone answering device according to this invention will be described with reference to FIG. 1 illustrating a circuit thereof.

As is apparent from FIG. 1, the device comprises telephone lines $L_1$ and $L_2$, resistors $R_1$ through $R_{15}$, capacitors $C_1$ through $C_{12}$, transistors $Q_1$ through $Q_7$, the transistor $Q_3$ being a field effect transistor, a line transformer LT with a primary winding PR, a secondary winding SE and a tertiary winding TH, an oscillating transformer OT, power sources, or batteries BAT-1 and BAT-1, and slide type switches or rotary type switches $S_{1-1}$, $S_{1-2}$, $S_{1-3}$ and $S_{1-4}$ which are operated simultaneously. Each of the switches has three positions: stop, automatic recording and manual recording or right, center and left which will become apparent later.

The device further comprises: diodes $D_1$ through $D_6$, variable resistors $VR_1$, $VR_2$ and $VR_3$, a fuse $f$, a relay Y having contact elements $y$-1, $y$-2, $y$-3 and $y$-4 each being in "break" position when the relay is not energized, a push button type test switch TS which is operated when the operating switches are set in the automatic recording position, and a pilot lamp PL connected in series to the relay Y. This pilot lamp PL has a filament which is low in its initial resistance, but the filament resistance is increased after it has been turned on by the operation of the relay Y, thereby to suppress the current flowing in the relay, that is, to reduce the current to the holding current of the relay. In this operation, it is natural that the excessive consumption of the battery causes to gradually reduce the brightness of the pilot lamp PL.

The device can be divided into blocks or section A, B, C, D, E and F in view of the functions thereof as indicated by dotted lines in FIG. 1.

The section A comprises the transistors $Q_1$ and $Q_2$ and the relay Y, and upon reception of a calling signal, operates the relay to form a loop circuit of the telephone lines.

The section B is a timer circuit having the field effect transistor $Q_3$. This timer circuit B operates to maintain the self-holding condition of the relay Y which has been energized, and to open the self-holding circuit in a period of time which is predetermined by the variable resistor VR-2, or in approximately 60 seconds, and to open the telephone lines thereby to allow the whole device to be ready for the next calling.

The section D is an astable multi-vibrator circuit comprising the transistors $Q_4$ and $Q_5$. When the operating switches are set at the automatic recording position, the transistor $Q_4$ is rendered non-conductive, or off, for very short period of time (less than 0.5 second) once in about seven second, thereby to form beep tone signals described later.

The section C is a special oscillator circuit comprising the transistor $Q_7$ and the oscillating transformer OT to producue a special signal like a small bird's twittering. If a simple signal is produced, a caller may mistake it for a warning signal for instance and hang up the receiver. In order to overcome this trouble, the special oscillator circuit C is provided. In other words, if the sound like the small bird's twittering is generated, he will listen to it to find out what it is for a while, and finally he will hear the beep tone and know that his message can be recorded.

The section F is a control circuit for controlling an incoming message recorder G provided externally. Terminals $m_1$ and $m_2$ of this circuit F are connected to an electric motor circuit of the recorder G, the motor circuit being completed by the contact $y$-4 of the relay Y, while other terminals $n_1$ and $n_2$ serve to deliver the signal from the secondary winding SE of the line transformer to the amplifier AMP in the recorder G.

The section E is a buffer circuit located between the sections C and D for controlling the function of the above-described oscillator.

Hereinafter, for convenience in description, the assembly of the sections A, B, C, D, E and F will be referred to as "a main body", and the assembly plus the incoming message recorder G as "the device according to this invention" when applicable. However, it should be noted that the recorder G may be incorporated in the main body or may be separable from the same.

The operation of the device will now be described. In this connection, it is assumed that the operating switches are set at the automatic recording position.

When a signal of 16 cycles is applied through the line $L_1$ and $L_2$ to the device, the signal flows through the break contact of the contact element $y$-1 of the relay Y, the capacitor $C_3$ and the resistor $R_1$ and is rectified by the diodes $D_1$ and $D_2$. The signal thus rectified goes through the variable resistor VR-1 whereby electrical charges are stored in the capacitor $G_5$. When the charges are stored to a certain value, a positive voltage is applied through the diode $D_3$ to the base of the transistor $Q_1$, as a result of which the transistor $Q_1$ is rendered conductive and a voltage drop is therefore caused by the emitter resistor $R_4$. This voltage is applied to the base of the transistor $Q_2$ to render the latter $Q_2$ conductive also, which leads to the energization of the relay Y.

Upon energization of the relay Y, the pilot lamp PL is turned on while the contacts elements $y$-1 through $y$-4 are set in "make" position, that is, the armatures thereof are thrown to the make contacts $m$ from the break contact $b$. As a result, the contact element $y$-1 causes the lines $L_1$ and $L_2$ to form a loop circuit with the primary winding PR of the line transformer LT, while the contact element $y$-2 supplies electric current to the drain of the field effect transistor $Q_3$. In this operation, a voltage is applied through the capacitor $C_6$ to the gate electrode of the transistor $Q_3$ to render the latter $Q_3$ conductive, and the capacitor $C_6$ is charged gradually through the variable resistor VR-2. Upon completion of this charge, the transistor $Q_3$ is rendered non-conductive, or off. In this embodiment, the time constant is predetermined so that the period of time between the on and off operations of the transistor $Q_3$ is 60 seconds. When the armature of the contact elements $y$-2 was maintained at the break contact $b$ previously, the capacitor $C_6$ was shunted by the contact element $y$-2 and discharged completely. Therefore, the time constant has always a constant value whenever the armature of the contact element $y$-2 is thrown to the make contact $m$.

When the transistor $Q_3$ is rendered conductive as described above, a positive voltage is applied from the power source thereof through the resistor $R_2$ (about 33 k$\Omega$) to the base of the transistor $Q_1$ to render the latter $Q_1$ conductive. As a result, the self-holding circuit of the relay Y is formed. Thus, the relay Y is held for a certain period of time, whereby the loop circuit is continuously maintained, while an electrical current is supplied through the contact $y$-2 and the diode $D_5$ to the transistors $Q_4$, $Q_5$, $Q_6$ and $Q_7$.

The transistor $Q_7$ oscillates upon supply of the current thereto. The collector side and the base side of the transistor $Q_7$ are connected together through the tertiary winding TH of the line transformer. A network of the resistor $R_{13}$ (about 1kΩ), the capacitor $C_{10}$ and the resistor $R_{12}$ is provided as the base circuit of the transistor $Q_7$. Furthermore, the oscillating transformer OT is connected through the resistor $R_{11}$ to the base of the transistor $Q_7$. The primary winding of the transformer OT is connected to the secondary winding of the same by the capacitor $C_{12}$ provided between terminals $g_1$ and $g_2$ of the transformer OT.

The oscillator circuit C described above is a typical one which is designed to produce the special oscillation sound like a small bird's twittering through the various experiments. The network and the oscillating transformer connection may be modified in various ways.

As was described above, when the armature of the contact element y-2 is thrown to the make contact $m$ and the current is applied to the oscillator circuit C through the diode $D_5$, immediately the transistor $Q_7$ starts oscillation, and the oscillation sound is transmitted to the primary winding side, or the telephone line side, of the line transformer LT from the tertiary winding side TH. At the same time, the positive voltage is applied to the base of the transistor $Q_6$ through the variable resistor VR-3; however, the transistor $Q_6$ is maintained inoperative or cut-off because the capacitor $C_9$ (about 100 $\mu F$) is grounded to bypass the positive voltage.

However, in about three seconds determined by the time constant of the variable resistor VR-3 and capacitor $C_9$, the capacitor $C_9$ is charged. As a result, the positive voltage is now applied to the base of the transistor $Q_6$, that is, the transistor $Q_6$ is rendered conductive for the first time. In other words, the oscillation sound is transmitted to the primary winding side PR of the line transformer LT for the first three seconds, but thereafter the oscillation output is grounded through the diode $D_6$, the collector and emitter of the transistor $Q_6$, and the collector and emitter of the transistor $Q_4$ (described later), that is, the oscillation is suspended.

The relationships in operation of the transistors $Q_4$ and $Q_5$ in the astable multi-vibrator circuit D will now be described. In this circuit, the capacitance of the capacitor $C_8$ is greater than that of the capacitor $C_7$. Accordingly, when the circuit is energized, the operation of the transistor $Q_5$ occurs later than that of the transistor $Q_4$, that is, first the transistor $Q_4$ is rendered conductive for a long time, and while the transistor $Q_5$ is rendered non-conductive for a short time, and next these states are reversed. For instance, the point $x$ of the transistor $Q_4$ becomes "on" for 7 seconds and then "off" for 0.2 second. This condition is repeated so long as the timer circuit B is active.

As was described above, this astable multi-vibrator circuit is so designed that it has a period of about seven seconds and repeats the off condition for a short time period once in 7 seconds. Accordingly, first the oscillation is continued for about three seconds in the oscillator circuit C to transmit the oscillation output to the lines, and, thereafter, when the state of the transistor $Q_6$ is changed from its cut-off state to the conductive state, the oscillation output is grounded through the transistor $Q_6$ thus changed, whereby the ocillation is suspended. In about 4 seconds after this suspension, the transistor $Q_4$ is rendered non-conductive, or off.

Figure 2:
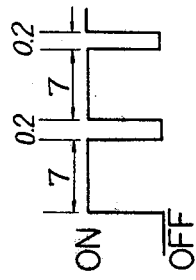
FIG. 2 is a graphical representation indicating a voltage waveform at the point X in FIG. 1.

More specifically, the transistor $Q_4$ is first conductive and is then rendered non-conductive in about 7 seconds. After this non-conductive condition of the transistor $Q_4$ has been maintained for about 0.2 second, it is rendered conductive again, as is indicated in FIG. 2.

That is, the oscillation is effected for the first three second after the energization, and is then suspended for 4 (4=7−3) seconds, and thereafter the oscillation is effected for about 0.2 second. After this, the oscillation for about 0.2 second is repeated once in 7 seconds.

The sound of the oscillation for the 0.2 second is delivered out in almost the same state as simple pulses because it is the first part of the intricate oscillation sound. In this invention, this sound is utilized as the beep tone signal which has been employed in telephone conversation recording devices, to notify the caller that his message can be recorded.

Accordingly, a person familiar to the use of such a telephone answering device can see that he is calling over a telephone answering device and it is ready for recording his message even if he tries for the first time.

The caller's voice signal, or his message, is introduced through the secondary winding SE of the line transformer LT and the terminals $n_1$ and $n_2$ of a microphone MIC to the amplifier AMP in the section G where it is amplified and recorded in the tape. In this operation, the armature of the contact element y-4 of the relay Y is maintained at the make contact $m$ and the operating switch $S_{1-4}$ is at the "automatic recording" position. Therefore the terminal $m_1$ is connected to the other terminal $m_2$. As a result, the tape driving motor M built in the incoming message recorder is operated.

The terminals $n_1$ and $n_2$, and $m_1$ and $m_2$ are ones corresponding to the receptacle of a microphone used in the ordinary cassette tape recorder and are controlled remotely by a switch provided on the microphone.

The occurrence of the beep tone is, in general, once in about 15 seconds. However, in this invention, the beep tone is produced once in seven seconds so that the caller may not feel uneasy in sending his message since the device is used during the period no one is home. Of course, it is readily achieved to change the interval from 7 seconds to 15 seconds by changing the resistances of the resistors $R_9$ and $R_{10}$.

In addition, the 0.2 second is determined by the time constant elements, or the resistor $R_7$ (100KΩ) and the capacitor $C_7$ (1$\mu F$). The values of these elements $R_8$ and $C_7$ can also be changed if necessary. The contact element y-3 of the relay Y operates to discharge the capacitor $C_9$ immediately when the relay Y is deenergized. Therefore even if, immediately after the completion of recording one caller's message, another calling is made, the transmission of peculiar signal for 3 seconds can be effectively obtained again because the capacitor $C_9$ has been completely discharged by the operation of the contact element y-8.

Thus, the caller completes recording his message in the incoming message recorder.

On the other hand, the charging of the capacitor $C_6$ in the timer circuit for the transistor $Q_3$ advances with time, as a result of which the transistor $Q_3$ is rendered non-conductive finally, that is, the circuit driving the transistor $Q_1$ through the resistor $R_2$ is opened. Accordingly, the transistor $Q_2$ can no longer hold the relay Y, that is, the relay Y is de-energized, and the pilot lamp PL is also turned off. Upon deenergization of the relay Y, all of the contact elements are restored, that is, the armatures of the contact elements are thrown to the break contacts $b$, and the device is now waiting for the next call. The operations described above are conducted for every call.

The case where the operating switches are set at the manual recording positions will now be described.

By setting the operating switch $S_{1-2}$ at the manual recording position, the calling signal circuit in the section A and the relay Y in the section B are made inoperative and the timer circuit in the section B is not supplied with electric current; however, only the multi-vibrator circuit D, the oscillator circuit C and the buffer circuit E are made operative.

At the same time, the transistor $Q_6$ and the capacitor $C_9$ are disconnected from each other by setting the switch element $S_{1-3}$ at the manual recording position, while the power supply is connected to the transistor $Q_6$ by setting the switch element $S_{1-2}$ at the manual recording position as a result of which the transistor $Q_6$ is immediately rendered conductive, and accordingly the oscillation for about 3 or 4 seconds of the section C is suspended. In other words, the transistor $Q_6$ is conductive and in addition the transistor $Q_4$ is also conductive. As a result, the base, or the point P, of the transistor $Q_7$ is grounded, whereby the answer signal like a bird's twittering for the initial three seconds is not produced. Thereafter, the transistors $Q_4$ and $Q_5$ change their on-off states every 7 seconds. Since the transistor $Q_4$ becomes non-conductive for 0.2 second in 7 seconds thereby causing the point P to be disconnected from the ground, as a result of which only the beep tone is transmitted to the telephone lines for 0.2 second. Listening to this beep tone, a caller and a person called or an operator of the device can see that their conversation over the telephone is being recorded by the device, therefore, the violation of their privacy can be prevent.

Figure 3:
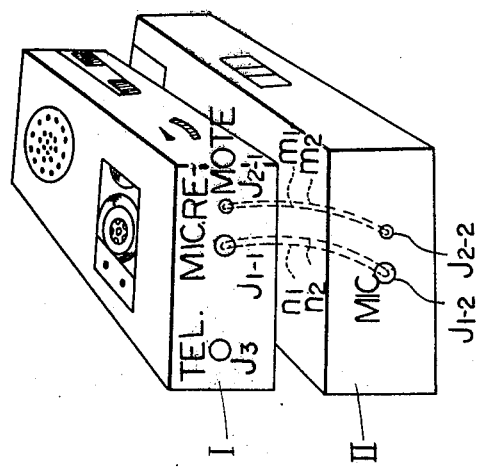
FIG. 3 is a perspective view of a main body of the device according to this invention and an incoming message recorder which are connected with patch cords.

FIG. 3 is a perspective view of the main body I and an extremely small tape recorder II which is approximately the same in size as the main body I. In general, such a tape recorder as operated by batteries has ordinarily a microphone jack $J_{1-2}$ and a remote control jack $J_{2-2}$ which are provided adjacent to each other as shown in FIG. 3. These jacks are connected to the microphone jack $J_{1-1}$ and the remote control jack $J_{2-1}$ with patch cords $n_1$ and $n_2$, and $m_1$ and $m_2$. Another jack $J_3$ is provided for connecting the main body to the telephone lines.

Now, the procedure which the operator should carry out with this device will be described.

Before he leaves his house for instance where is installed a telephone set equipped with the device, he sets the tape recorder or the incoming message recorder in recording state, but the tape recorder is not energized, because the above-mentioned patch cords are installed between the main body and the recorder. In other words, the recorder is energized only when the relay Y (FIG. 1) is energized. While his absence, messages will be recorded, if any, as described above. If, when he returns home, he sets the operating switches at the stop position, and removes the patch cords, the messages thus recorded can be reproduced by holding the small tape recorder in his hand. When a tape recorder is small in size, it is much easier to operate the tape recorder by holding it in hand. This is the reason why the cords are installed to be easily removed. In this connection, when the internal tape recorder is larger in size, longer patch cords pre necessary. It is rather troublesome to connect these longer patch cords to the main body or disconnect them from the same. However, this can be overcome by setting the switches at the stop position, because if the switches are set at the stop position, the recorder can be operated without removal of the patch cords.

As was described above, in the device according to this invention, the loop circuit is formed in response to a telephone calling signal, whereby the special answering signal like a bird's twittering is transmitted to the caller for about three seconds and thereafter the first beep tone signal is transmitted to him in about four second. If he sees it from these signals that his message is to be recorded, and starts talking or sending his message, his message will be recorded in the external tape recorder which is designed so as to start its operation at the same time as the main body. In the predetermined period of time, the state of the device is restored.

During the operating period of the system, the beep tone signals are produced successively once in seven seconds so as to let him known that the device is in operation, that is, his message is being recorded. Accordingly, the provision of this device contributes to the simplification in construction of the conventional telephone answering device which necessitates two tapes: one is a tape in which the response terms have been recorded in advance, while the other is a tape in which a message is to be recorded. Furthermore, in the device according to this invention, electric current is scarcely consumed during the period when the device waits for calling signals, and even when the device is in operation, the holding current of the relay Y is adjusted to be extremely small by the filament of the pilot lamp PL after the energization of the relay Y. Accordingly, power consumption of the device is very small.

In addition, the simple gate circuit is provided between the oscillator circuit and the multivibrator circuit, for properly controlling both the answering signal which is produced for the first three seconds after the start of the operation and the production of the beep tone signals which are delivered to the lines once in seven seconds after the production of the answering signal like bird's twittering.

The device described above can be made smaller in size than portable transistor radio sets. Accordingly, it may be carried with the user when he goes on a journey for instance. Thus, the device according to this invention can remarkably improve the effects of the telephone answering device.

I claim:

1. A telephone answering device with means for controlling an incoming message recorder automatically in response to a calling signal, comprising ringing circuit means for energizing switching means in response to a calling signal; timer means energized through said ringing circuit means for starting the operation of said device and to deenergize the ringing circuit means after a predetermined period of time; a line transformer comprising a plurality of windings with a first winding connected through said switching means to telephone lines of the telephone answering device, a second winding for transmitting an oscillating signal to the telephone lines, and a third winding for introducing a caller's message to an external incoming message recorder; oscillator means with means for energizing said oscillator means through said switching means; said oscillator means being energized at the same time as said timer means to produce a predetermined answering signal; an astable multi-vibrator with means for setting said multi-vibrator to be off for a substantially short period of time at every preset time interval; and switching gate means connected between said oscillator means and said astable multi-vibrator and having means for setting said multivibrator nonconductive for substantially three seconds after energization of the timer means, said multivibrator becoming thereafter conductive, to control thereby the oscillation of said oscillator circuit.

2. A device as claimed in claim 1, including a power source, said ringing circuit having a pilot lamp between said switching means and said power source, the filament of the pilot lamp being relatively low in its initial resistance and, when upon energization of said switching means the lamp is turned on and the resistance of the filament is increased, the electrical current through said switching means is limited to a minimum current value necessary and thereby minimizing electric power consumed in said switching means, said lamp indicating that the telephone lines are maintained closed.

3. A device as claimed in claim 1, wherein said oscillator means comprises semiconductor means, and feedback means of a transformer coupling and a C.R. coupling respectively between the collector and the base of the semi-conductor device and between the base and the emitter of said semiconductor means, the combination of the feedback means and the semiconductor means producing a predetermined tone signal for three seconds.

4. A device as claimed in claim 1, wherein said astable multivibrator comprises first and second transistors with means for repeatedly turning on said multivibrator for substantially seven seconds and turning said multivibrator off for 0.2 second when said device is set to operate in absent condition, said multivibrator being turned on for substantially 15 seconds and off for 0.2 second by adjustment of values of a capacitor and a resistor thereof, and an operating switch for setting the device to operate under the condition that mutual telephone conversations are recorded in the incoming message recorder.

5. A device as claimed in claim 1, wherein said switching gate means comprises a transitor and integration means having an integration capacitor connected to the base of the transistor, the collector of the transistor being connected to the base of the semiconductor means in the oscillator means, the emitter of the transistor being connected to the collector of a first transistor of said astable multivibrator, said first transistor becoming conductive earlier than a second transistor of the astable multivibrator, the base of the first-mentioned transistor being grounded through the integration means, the first-mentioned transistor being not rendered conductive immediately after the energization of the switching gate means even if voltage is applied to the base thereof by the discharge of the integration capacitor, after charging the capacitor of the integration means in about three seconds from the energization, said first-mentioned transistor being rendered conductive thereby electrically connecting the astable multivibrator and said oscillator means, the operation of said oscillator means being controlled thereafter by on-off operation of the astable multivibrator.

6. A device as claimed in claim 1, including four operating switches each having three positions corresponding to automatic recording, stop and manual recording, the operating switches being set at the automatic recording position to carry out said operations of said device, and being set at the manual recording position to energize said oscillator means, said astable multi-vibrator and said switching gate means only without energizing said switching means and without delaying time by the switching gate means, whereby the operation of the oscillator is only controlled by said first transistor from beginning, said first transistor becoming non-conductive at every set time of the astable multi-vibrator, said operating switches being set at the stop position to de-energize said oscillator, multivibrator and switching gate means in such a manner that an incoming signal can go through said first and second windings to an amplifier of an external tape recorder, and an electric motor of an external tape recorder driven through an operating switch, the incoming signal being recorded free of beep-tones on the external tape recorder as long as the external tape recorder is in a recording mode.

* * * * *